US005733086A

United States Patent [19]
Jakob

[11] Patent Number: 5,733,086
[45] Date of Patent: Mar. 31, 1998

[54] COMBINED RIVET/NAIL COMPONENTS AND METHODS FOR USING SAME

[75] Inventor: Horst Jakob, Deaux, France

[73] Assignee: ASER, Saint-Chamond, France

[21] Appl. No.: 530,351

[22] PCT Filed: Feb. 2, 1995

[86] PCT No.: PCT/FR95/00132

§ 371 Date: Nov. 28, 1995

§ 102(e) Date: Nov. 28, 1995

[87] PCT Pub. No.: WO95/22008

PCT Pub. Date: Aug. 17, 1995

[30] Foreign Application Priority Data

Feb. 9, 1994 [FR] France .................. 94 01452

[51] Int. Cl.⁶ .................................................. F16B 19/08
[52] U.S. Cl. .............................. 411/501; 411/34; 411/500
[58] Field of Search ............................ 411/54, 501, 500, 411/45, 44, 448, 449

[56] References Cited

U.S. PATENT DOCUMENTS

| | | | |
|---|---|---|---|
| 2,647,432 | 8/1953 | Huck | 411/501 |
| 2,670,647 | 3/1954 | Jones | 411/339 |
| 3,358,550 | 12/1967 | Crowther et al. | |
| 3,461,771 | 8/1969 | Briles | |
| 3,479,072 | 11/1969 | Kosar | 411/54 |
| 3,494,246 | 2/1970 | Hensley | |
| 3,913,180 | 10/1975 | Pray | 24/31 B |
| 4,112,993 | 9/1978 | Dey | 411/501 |
| 5,177,922 | 1/1993 | Ovaert et al. | 52/410 |
| 5,185,179 | 2/1993 | Yamazaki et al. | 427/601 |
| 5,333,980 | 8/1994 | Pratt et al. | 411/501 |
| 5,464,667 | 11/1995 | Köhler et al. | 427/577 |
| 5,525,420 | 6/1996 | Kaufmann | 428/336 |
| 5,528,834 | 6/1996 | Seber et al. | 30/340 |
| 5,531,444 | 7/1996 | Buettner | 473/349 |

FOREIGN PATENT DOCUMENTS

| | | |
|---|---|---|
| 702980 | 4/1931 | France . |
| 1468842 | 10/1965 | France . |
| 2106270 | 9/1971 | France . |
| 1752343 | 5/1968 | Germany . |
| 263364 | 11/1949 | Switzerland . |

OTHER PUBLICATIONS

Patent Abstracts of Japan vol. 15, No. 182, 10 May 1991, JP-A-03 043 105.

*Primary Examiner*—Steven N. Meyers
*Assistant Examiner*—Tuyet-Phuong Pham
*Attorney, Agent, or Firm*—Browdy and Neimark

[57] ABSTRACT

The invention is directed to a rivet nail which can include two separate pieces or one single piece. Each rivet nail has a hollow rivet part having a head (1) and a cylindrical stem (2) axially connected to the head. The end located opposite to the end carrying the head (1) has a hollow cylindrical space extending inside the cylindrical stem (2) over at least a part of the cylindrical stem (2) length, and a nail part including a hollow cylindrical stem extending taperwise to form a nib (4).

15 Claims, 4 Drawing Sheets

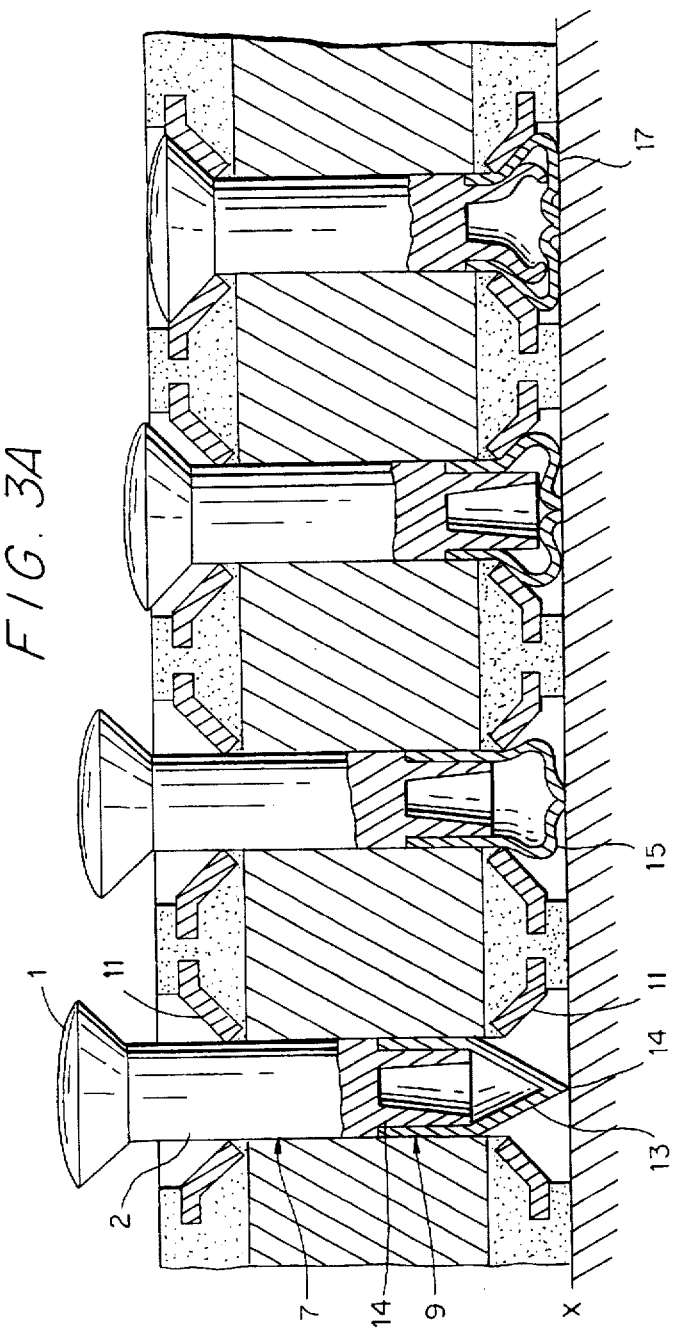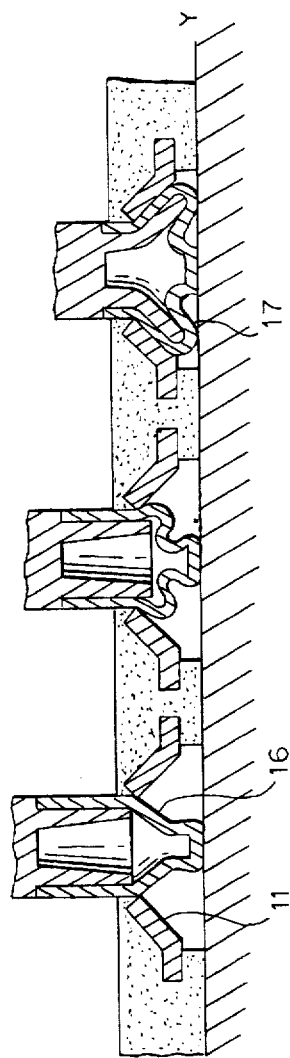

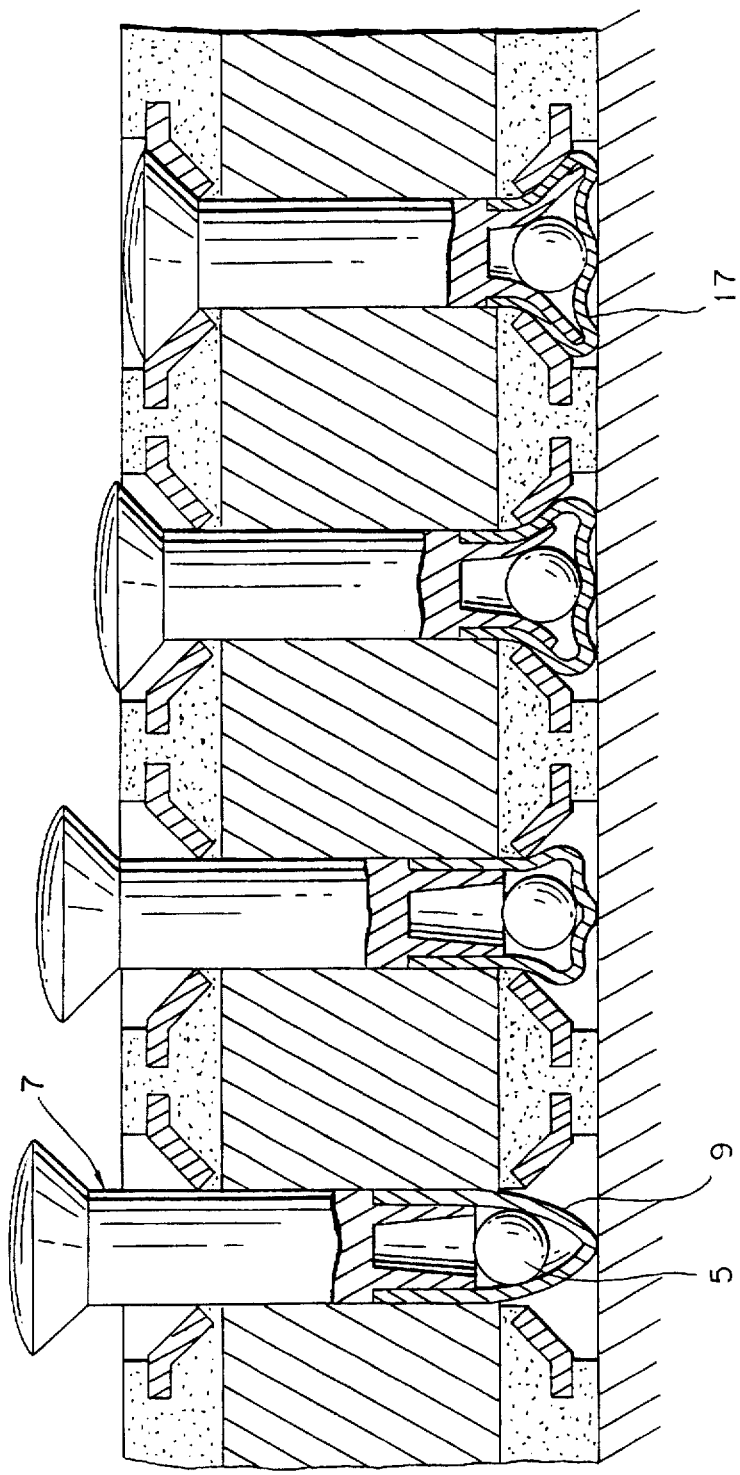

COMBINED RIVET/NAIL COMPONENTS AND METHODS FOR USING SAME

BACKGROUND OF THE INVENTION

1. Technical Field of the Invention

The present invention concerns a rivet, characterised by the fact that it is made up of two parts, forming two pieces or one single piece, one of them being a hollow rivet comprising a head, a cylindrical stem and possibly a peripherial shoulder on the external side of its cylindrical stem, the other one being a headless hollow cylindrical nail, one end of which is edged and preferably sharp, the other end being hollow with internal dimensions enabling the adjusted threading or passage of the hollow nail through the part forming a hollow rivet up to the shoulder or up to the head thereof.

The invention concerns also several alternative of rivets according to the invention as well as methods of implementation of the rivets according to the invention.

2. Prior Art

Several types of rivets are known. The present invention concerns rivets provided for assembling products in band or in sheets, and particularly for assembling joining staples or other joining means for conveyor belts to the ends thereof. To this aim several types of rivets have been used heretofore. There are rivets constituted of one single piece, one end of which has a preformed head; these rivets designed in order to be threaded through holes, previously provided in sheet or band shaped materials which have to be assembled, as well as through joining staples or in any other joining means, the other end which does not comprise a preferred head, projecting from the other side of the materials which have to be assembled in order to be hammered and to form a head on this other side. These well known rivets, used for a long time, have the inconvenience of requiring successively, access to one face of the whole of the materials to be assembled, then access to the other face. This is not practical in many applications and particularly in the case where joining means for conveyor belts have to be assembled to the ends of the conveyor belts.

These operations are most often carried out under actual hard conditions (limited space on the sites in particular in mines). But even under different conditions, for instance in open air or in large industrial workshops, the handling of the ends of large width conveyor belts is rather difficult. It is the reason why solutions have been sought, for carrying out the setting into position of a rivet from one single face of the materials to be assembled, together with its riveting, without having access to the other face of the materials to be assembled. Thus, the U.S. Pat. No. 3,913,180 has disclosed a hollow rivet provided with a provisional anvil threaded into the hollow end of the said hollow rivet. This rivet-anvil is thrusted into holes previously provided in the materials to be assembled. The head of the hollow rivet is then hammered against the anvil, and after crossing the materials is inserted in the holes provided in a support plate, and matching with to the pattern of the holes formed in the materials to be assembled, the circular anvil seating on the support against a flange, the other side of which, generally tapered, is used as an anvil surface. By hammering the rivet head located on the face through which the anvil and the rivet have been thrusted into the holes previously formed, the cylindrical opposite hollow end of the hollow rivet is pushed against the walls slanted towards the upper side of the anvil flange and forms a head which pinches the materials to be assembled in association with the previously formed rivet head, located on the other face of the whole of the materials to be assembled. The anvil is thus released and can be scrapped. This rivet has been largely used, although it presents many drawbacks. In particular, it is absolutely necessary that all the product or material layers to be joined together be provided with holes previously formed.

OBJECT AND SUMMARY OF THE INVENTION

Thus, the present invention proposes a solution to these problems, by providing a rivet, the riveting of which can be carried out in a simple and labour inexpensive way, from one single and same side of the materials to be assembled without requiring holes previously formed in all the materials to be assembled, the riveting obtained being of the best quality.

The problem thus set up, is solved according to the present invention, characterised by the fact that it comprises two parts, either in two separate pieces or in one single piece:

- a hollow rivet part having a head and a cylindrical stem axially connected to the head, the end of which opposed to the one which carries the head comprises a hollow cylindrical space formed axially inside the cylindrical stem, over at least part of its length,
- a nail part comprising a cylindrical hollow stem extending taperwise to form a nib.

According to one method of the present invention, this two part rivet may be either directly thrust into the materials to be assembled, which permits the penetration of the nail part which precedes the hollow rivet part while the rivet-nail according to the invention is hammered through the various layers of the products to be assembled, or hammered through holes previously formed in the whole or part of the materials which have to be assembled. When the products to be assembled have metallic or hard plastic parts, for instance staples for conveyor belts joining devices or other joining means, or when these joining device elements, even if they are in a material enabling the penetration of the nail part of the rivet-nail according to the invention, comprise previously and intentionally formed holes, often lined or with reinforcement rings, it is also possible to fit these joining means elements on the conveyor belt ends which are to be fitted, and then first hammer the rivets-nails through the holes previously formed in the joining device element, then by hammering the rivets-nails head, to force them across the conveyor belt, the nib of the nail part crossing easily through the material of the conveyor belt, then by hammering them through another hole previously formed in another leg of a joining element located under the conveyor belt.

The nib of the rivet-nail, meets then in all cases, either when the rivet-nail has been hammered directly through the materials to be assembled or through previously formed holes, the plane even surface of a working support, which can be used as an anvil, on which the nib of the nail part is distorted. Thereafter the lower part of the hollow rivet is in turn distorted as explained in detail hereafter. These distortions of the nib of the nail part and of the lower part the hollow rivet part result in a strong and reliable assembly of the two parts, with the formation of a second head under the layer's of materials to be assembled, which in association with the first head, pinch these layers in a strong and safe way. Obviously other means than hammering may be used, for instance hydraulic, pneumatic or mechanical tightening means may be used, which can be easily set, in order to distort and to tighten the rivets in an adjustable and predetermined way.

As it will appear from the examples described hereafter in relation with the drawing, several complementary means can be used to carry out easily or to finish the formation of the head, on the nail side of the rivet, as well as the distortion of the hollow rivet part in the head of the nail part. For instance, by utilizing the preferential folding areas obtained by localised thinnings of the nib wall of the nail part, the distortion of this part can be directed for instance either inwardly or outwardly. The addition of a fluid, a pasty or plastic material, in the internal closed space formed between the hollow rivet part and the nail part, enables the distortion of this latter preferably outwardly, when submitted to the overpressure generated during the implementation of a rivet achieved in this way. Last, in order to obtain, mainly in the case of large dimension rivets, a perfect enlarging of the hollow rivet part inside the head formed by the nail part, a ball can also be inserted inside the nail part. The said ball seating on the one hand against the internal wall of the nail part, on a circular peripherial contact line, and on the other hand against the hollow end of the hollow rivet. The ball diameter is intentionally larger than that of the cylindrical hollow space of the hollow rivet part. It is understood that during the implementation of the rivet-nail according to the invention, this ball applies over the whole of the nail part periphery as well as over the periphery of the end of the hollow rivet part. The combined effect of the stresses on the ball being due to the hammering or to the tightening of the rivet-nail during its implementation. The quality of the distortions thus obtained provides a still stronger link. Since the more that since the ball remains trapped, all the parts of the pieces remain perfectly applied against each other without giving rise to a progressive lash, for instance during the stresses to which a conveyor belt junction is submitted.

BRIEF DESCRIPTION OF THE DRAWINGS

The invention will be explained, in relation with examples of embodiment associated to an accompanying drawing in which:

FIGS. 3A and 3B show the various steps of the implementation of a rivet-nail according to the preferred method of achievement of the invention, the lower part of the rivet part being distorted inwardly in the case shown in FIG. 3A, and outwardly in the case shown in FIG. 3B;

FIG. 6 is an elevation view with partial longitudinal cross section of a further alternative embodiment of the rivet-nail according to the invention, comprising a ball inserted between the hollow rivet part and the nail part, as well as its distortion steps during the riveting operation.

DETAILED DESCRIPTION OF THE PREFERRED EMBODIMENT(S) OF THE INVENTION

Figure 1:
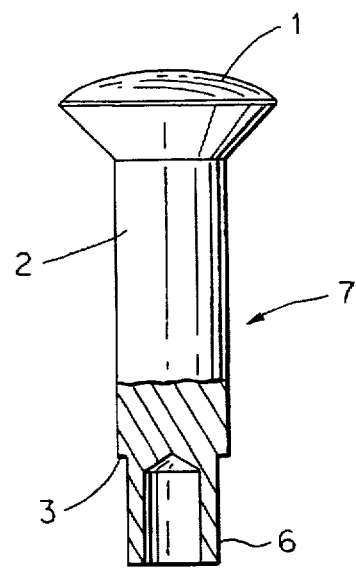
FIG. 1 is an elevation view, with partial cross section along a diametral plane of the hollow rivet part of a rivet-nail according to the invention.

The hollow rivet part 7 of a rivet-nail according to the invention, shown on FIG. 1, comprises a head 1, a cylindrical stem 2, with a hollow lower end 6, on the drawing, and a shoulder 3 provided on the external cylindrical surface of the stem.

Figure 2:
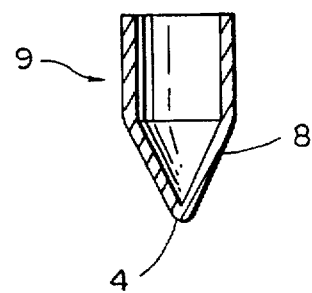
FIG. 2 is an elevation view, with partial cross section along a diametral plane of the nail part of a rivet-nail according to the invention.

The hollow nail part 9 of a rivet-nail according to the invention shown on FIG. 2, comprises a hollow conical part, including a cylindrical part 8, and a nib 4 both of which are hollow. The internal diameter of this cylindrical part 8 being chosen in a way enabling engaging of the nail part 9 on the lower part 6 of the hollow rivet part 7, up to the shoulder 3, the two pieces being maintained assembled by friction 14.

Figure 4:
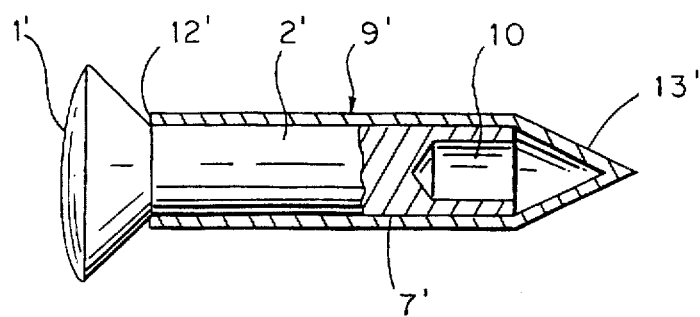
FIG. 4 is an elevation view with partial longitudinal cross section of an alternative embodiment of the rivet-nail according to the invention.
Figure 5:
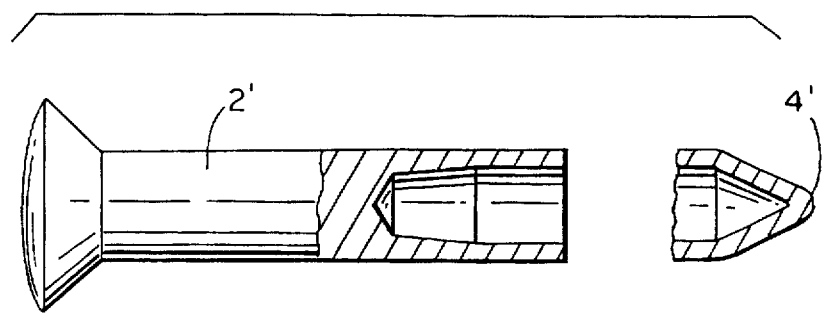
FIG. 5 is an elevation view with partial longitudinal cross section of a further alternative embodiment of the rivet-nail according to the invention.

FIGS. 3A and 3B show the steps of riveting of a rivet according to the invention made up of the hollow rivet 7 according to FIG. 1 and of the hollow nail 9 according to FIG. 2. As shown in FIGS. 3A and 3B, on the first operation line x the conical part of the hollow nail is distorted outwardly, whereas on the second operation line the conical part of the hollow nail is distorted inwardly. These distortions could be promoted by reduced thickness areas 15, 16 shown in FIG. 3. As shown in FIGS. 4 and 5, in an improved alternative embodiment of the invention, the distortion is obtained outwardly, due to the insertion of an approximately incompressible material 10, either liquid or pasty, in the hollow part of the rivet-nail made up of the hollow part of the rivet part and by the hollow part of the nail part.

It will be observed from FIGS. 3A and 3B, that are provided with reinforcement washers 11, which are also used as supporting surface for the head 1 of the hollow rivet part and/or for the head of the nail part 17, once this latter is formed. Advantageously these washers 11 are cup-shaped, the slope of which matches with that of the lower side of the head, in the case where this side has a tapered or a truncated shape, and in other implementations they may combine a cylindrical part (not shown) and a part forming the washer itself, which may be flat tapered or truncated, the cylindrical part being used as a lining for the hole which crosses the thicknesses and joining possibly a cylindrical part extending from the other side, associated to a flat, a tapered or a truncated washer.

Generally, according to the same method, various combinations are moreover possible, ranging from a bare cylindrical tube, its ends used as reinforcement of the holes crossed through and as direct support of the heads, to cylindrical parts in one single piece with a flat tapered or truncated washer located at one end, or to single washers as shown in FIGS. 3A and 3B.

In the alternative solution shown on FIG. 4, the hollow rivet part 7, does not have a shoulder on its cylindrical stem 2', the nail part 9' being engaged over this cylindrical stem 2', to the point where it abuts against the lower face 12' of the head 1' of the hollow rivet part 7'. On the figure, this head 1' is shown with a perfectly tapered lower side. Obviously it could be truncated in such a way as its upper end, as shown on the drawing, of the nail part seats well evenly on the plane part of this lower truncated side of the head of the hollow rivet part.

In the alternative solution shown on FIG. 5, the two parts, i.e. hollow rivet and nail, form one same and single piece, the cylindrical stem 2" of the hollow part, extending conically to form the nib 4" of the nail part. This conical extension may be obtained for instance by a tapering or compression operation of the lower end of the cylindrical stem which is to be appropriately dimensioned.

Last, FIG. 6 represents an alternative embodiment of the rivet-nail according to the invention comprising between the assembled nail part and hollow rivet part a ball 5, for instance a steel ball, abutting against the lower end of the hollow rivet part along a circular contact line and against the internal wall of the nail part. As shown on the figure, this ball 5 participates along with the distortion of the nail part and then of the hollow rivet part, to even contact all over the periphery of the two parts which have to be assembled, thus assuring an evenly distributed distortion of these two parts of the rivet-nail according to the invention.

Obviously, the adjunction of the ball, carried out during the assembly of the two parts is compatible with the adjunction of a liquid or of a plastic material 10 approximately uncompressible, mentioned hereabove, each one of the adjunctions playing a different role, but each one participating to the quality of the junction obtained.

Furthermore, the presence of the ball 5 which maintained in the assembly avoids the generation of localised slashes in the assembly, which would develop eventually, for instance during the stresses to which a conveyor belt junction is submitted. Since the 5 abuts continually and evenly over the whole periphery, no local distortion is possible and in order to break down the assembly simultaneously over the whole periphery, tremendous efforts must be exerted, which are never generated in practice.

A further improvement can be added to the rivets-nails, according to the invention. It concerns a treatment for surface hardening the rivet-nail, in particular the nail part and mainly its tapered part, by a plasma treatment resulting in a deposit of a thin layer of titanium nitride 13. A still more effective treatment used in combination with the rivets-nails according to the invention, consists in a plasma aided chemical coating of carbon and hydrogen, leading to the deposit of a thin layer of a diamond type carbon (sp3) and of a trigonal graphite type carbon (sp2) 13'. Such a coating, known per se, improves considerably the penetration of the nib through the rubbers and in the plastic materials, particularly without tearing neither the material nor the reinforcement lattice of the conveyor belts; in that case the nib can be slightly rounded, without reducing the penetration, which may suffer from the very slipping deposit.

Thus, the rivet-nail according to the invention, reaches under all the alternative embodiments disclosed hereabove, the objects aimed by the invention: to provide a rivet, the riveting of which can be carried out easily and under labour saving conditions, from one single and same side of the materials to be assembled, without requiring the previous formation of holes in all the materials which have to be assembled.

What is claimed:

1. A rivet comprising two parts forming two separate pieces; said two parts comprising, a hollow rivet part, and a nail part, the hollow rivet part having a first head (1) and a first cylindrical stem (2) connected axially to the first head, a first end distal from a second end of the hollow rivet part carrying the first head (1) having a hollow cylindrical space provided inside the first cylindrical stem (2) in an axial direction of the first cylindrical stem (2) over at least part of the length of the first cylindrical stem (2), the nail part having a second cylindrical stem which is hollow and includes a conical part which tapers to form a nib (4) at one end, the first cylindrical stem (2) being frictionally engaged into the hollow of the second cylindrical stem of the nail part for a distance equal to a length of the hollow cylindrical space of the first cylindrical stem (2), wherein the conical part of the rivet can be driven through a first side of a plurality of layers of material to be joined before the nail part with a portion of the first cylindrical stem (2) proximate to the hollow cylindrical space are respectively crushed and enlarged by a work surface abutting a second side of the plurality of layers to form a composite second head formed from the nail part and the portion of the first cylindrical stem (2), said second head engaging said second side and said first head engaging said first side to join said plurality of layers between said first head and said second head.

2. A rivet according to claim 1, wherein the first cylindrical stem (2) comprises an external cylindrical shoulder (3) projecting outwardly at a distance from the end of the cylindrical stem (2), located opposite the first head (1).

3. A rivet according to claim 2, wherein respective dimensions of the nail part, of the hollow rivet part and of the shoulder located on the first cylindrical stem (2), are such that when nail part is frictionally engaged over the first cylindrical stem (2) of the hollow rivet part up to the shoulder, the hollow cylindrical space of the first cylindrical stem (2) is engaged inside the second cylindrical stem of the nail part in such a way that the end of the first cylindrical stem (2) is positioned approximately at an origin of the conical part.

4. A rivet according to claim 2, wherein when a ball is placed in the hollow of the second cylindrical stem of the nail part bearing over a circular contact line on the conical part of the nail part and on the end of the first cylindrical stem (2) located opposite the first head (1), and the hollow rivet part and the nail part are threaded together, the nail part is in abutment against the shoulder (3) of the hollow rivet part.

5. A rivet according to claim 1, wherein the respective dimensions of the nail part and of the hollow rivet part are such that, when the nail part is frictionally engaged over the first cylindrical stem (2) of the hollow rivet part, the end of the nail part located opposite the nib (4) is in abutment against a lower side of the first head (1) of the hollow rivet part, and an end of the first cylindrical stem (2) is located approximately at the origin of the conical part.

6. A rivet according to claim 5, wherein a lower side of the first head (1) of the hollow rivet part has a truncated shape which tapers toward the first cylindrical stem (2), respective dimensions of the truncated shape first head (1) and of an end of the nail part located opposite to the nib (4) being such that, when the nail part is frictionally engaged over the first cylindrical stem (2) of the hollow rivet part, it abuts against a plane part located at an end of the truncated shape first head (1).

7. A rivet according to claim 1, wherein during engagement of the nail part and of the hollow rivet part, the hollow cylindrical space of the hollow rivet part and the hollow of the second cylindrical stem of the nail part are filled with an incompressible material at room temperature.

8. A rivet according to claim 1, wherein areas of reduced thickness are provided on the nail part, whereby crushing of the conical part of the nail part is promoted towards selected directions.

9. A rivet according to claim 8, wherein the crushing of the conical part of the nail part is carried out outwardly.

10. A rivet according to claim 8, wherein the crushing of the conical part of the nail part is carried out inwardly.

11. A method for using a rivet according to claim 1, comprising the steps of, driving the rivet through a first side of a plurality of layers of material to be joined together until the nib bears against a work surface abutting a second side of the plurality of layers, hammering the rivet to decrease a length thereof until the nail part and a portion of the first cylindrical stem (2) proximate to the hollow cylindrical space are respectively crushed and enlarged against the work surface to form a composite second head engaging said second side and said first head engages said first side thereby joining said plurality of layers between said first head and said second head.

12. The method according to claim 11, wherein during the hammering with a ball placed in the second cylindrical stem of the nail part bearing over a circular contact line of the conical part of the nail part and on the end of the first cylindrical stem (2) located opposite the first head (1), the ball is pinched between the conical part of the nail part and the end of the first cylindrical stem (2) located opposite the head and evenly enlarges the end of the first cylindrical stem (2) located opposite the first head (1) and evenly crushes the nail part.

13. A rivet according to claim 1, wherein the rivet is coated, at least over the conical part of the nail part, with a thin layer of a diamond type carbon, formed by a plasma chemical deposit.

14. A rivet according to claim 1, wherein the rivet is coated, at least over the conical part of the nail part, with a thin layer of trigonal graphite carbon formed by a plasma chemical deposit.

15. A rivet according to claim 1, wherein the rivet is coated, at least over the conical part of its nail part, with a thin layer of titanium nitride deposited by plasma.

* * * * *